July 28, 1942.   C. L. BEAL   2,291,068
INFLATABLE SAFETY DEVICE
Filed Dec. 30, 1939
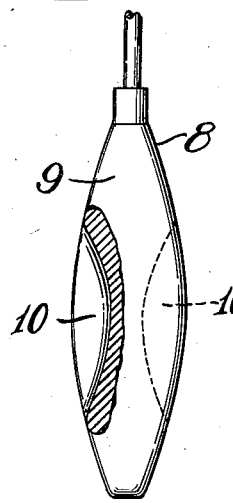
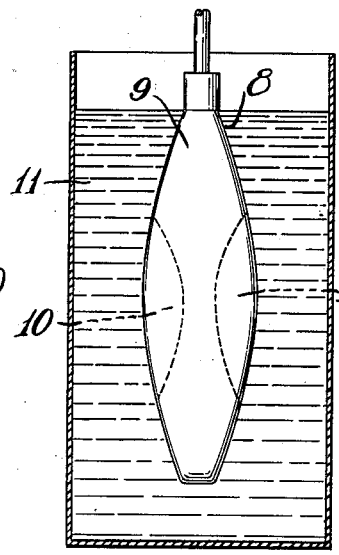
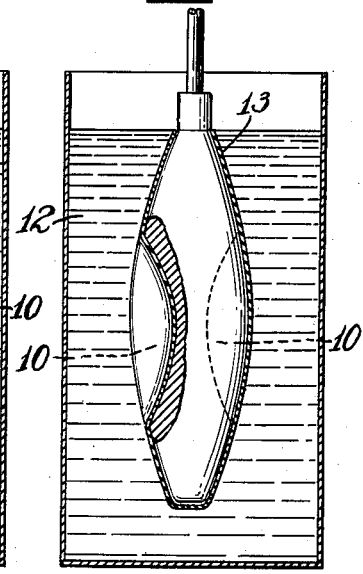
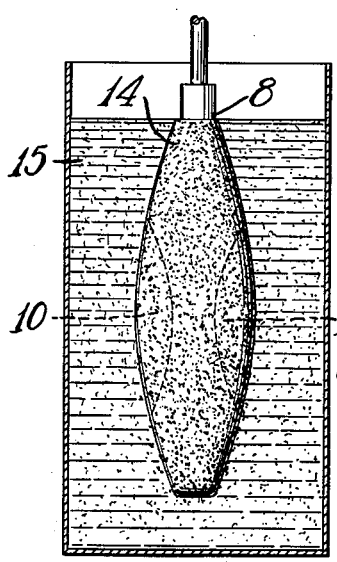
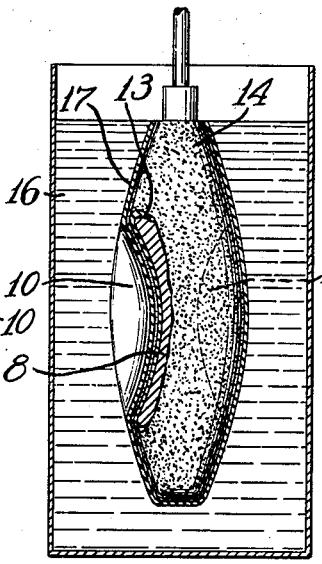
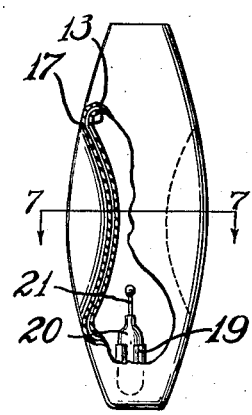
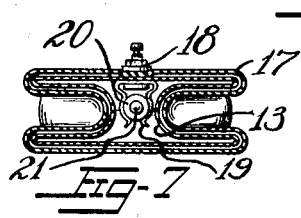
Inventor
Carl L. Beal
By Willis F. Avery
Atty Patented July 28, 1942

2,291,068

UNITED STATES PATENT OFFICE 2,291,068

INFLATABLE SAFETY DEVICE

Carl L. Beal, Cuyahoga Falls, Ohio, assignor to American Anode Inc., Akron, Ohio, a corporation of Delaware Application December 30, 1939, Serial No. 311,802

4 Claims. (Cl. 9—19)

This invention relates to an inflatable rubber safety device for the emergency use of swimmers, boatmen, duck hunters, and others who are likely to become subjected to the danger of accidental drowning; said safety device serving the purpose of providing added buoyancy while in the water. The invention also relates to a preferred method of making such a safety device, and similar articles.

There are several different kinds of safety devices that are made for the emergency use of swimmers and others to minimize the danger of drowning. Most of these are too bulky to be worn constantly, for instance the "donut" type, and even when made up in the form of jackets or belts containing buoyant members they are still uncomfortable and awkward to wear. Safety devices consisting of compact inflatable rubber envelopes containing easily broken metal cartridges of a compressed gas have also been made but such devices as heretofore constructed have not been entirely satisfactory for a number of reasons.

I have invented a safety device that overcomes the disadvantages of the various prior devices and which is safe, easily made and highly compact. This new article of manufacture comprises two one-piece seamless pouch-shaped rubber bags of like configuration, one inner and one outer, closely nested together in contiguous non-adhesive relationship, with the inner dimensions of the uninflated outer bag corresponding to the outer dimensions of the uninflated inner bag. These bags usually are substantially greater in length than in breadth and both bags are sealed in the process of manufacture. At one end of these bags a metal valve is placed to which is clipped, on the inside, a metal cartridge containing the inflatant, such as carbon dioxide, under pressure. This valve portion includes the spring metal clip to hold the cartridge in place. To release the compressed gas in the cartridge the tip of the cartridge is constructed so that it can be easily broken, thus instantly releasing the gas and inflating the rubber safety device.

The structure of the rubber bag portion of the swimmers' safety device with which this invention is principally concerned can best be described in connection with a preferred method of manufacturing the article as illustrated in the accompanying drawing, of which Fig. 1 is a side elevation of a form, partially cut away and sectioned to show the channeled construction of the form;

Figs. 2, 3, 4, and 5 are sectional elevations illustrating four steps in the process of manufacture, with the deposition form of Fig. 1 being successively immersed in a series of coating materials;

Fig. 6 is an elevation of the finished double tubed rubber article with a filled carbon dioxide cartridge placed therein as the inflating device and with a portion of the bag cut away to show its construction;

Fig. 7 is a vertical section taken on line 7—7 of Fig. 6, showing more clearly the superposed relationship of the two bags and their channeled construction as well as the valve and the replaceable, gas-filled cartridge.

In manufacturing the swimmers' safety device of this invention by a preferred process, as illustrated in the accompanying drawing, I utilize a deposition form 8, made of any suitable material such as porcelain, metal, wood, glass, Bakelite, rubber, or the like having a smooth surface 9 with two diametrically opposite channels 10, 10 as most clearly shown in Fig. 1. The form is immersed in a bath of coagulant solution 11 in the manner described in U. S. Patent No. 1,908,719, the coagulant solution desirably containing a pulverulent separating material such as finely-divided soapstone to prevent adhesion of the subsequently deposited rubber to the form, as described in U. S. Patent No. 1,924,214. After the immersion of the form in the coagulant the form is withdrawn, partially dried in air, and then immersed in a liquid dispersion of rubber 12 which preferably should be a suitably compounded aqueous dispersion such as compounded rubber latex. Upon allowing the form to remain in the rubber dispersion for a length of time sufficient to acquire a desired thickness of rubber coating 13, the coated form is withdrawn. Ordinarily the coating 13 will be about 0.019 inch thick after it has been dried and vulcanized. After the rubber deposit has become self-sustaining, and preferably after partial but not complete drying of the deposit to a tacky state favorable to cohesion with a subsequently superposed similar deposit, the entire outer surface of the rubber coating is covered with a layer of a separating material adapted to prevent cohesive union between the underlying rubber layer and a subsequently superposed similar deposit of rubber. A coating 14 of pulverulent water-insoluble material such as soapstone, clay, diatomaceous earth, magnesium carbonate, mica, graphite, or the like is preferred for this purpose and may be most conveniently applied by immersing the rubber coated form (Fig. 4) in a bath 15 comprising a suspension of the pulverulent material in a suitable volatile liquid vehicle such as water, or an organic solvent such as alcohol or acetone, and preferably, but not necessarily, containing in addition a rubber coagulant to facilitate subsequent deposition of rubber from the liquid dispersion, as when latex is utilized. The pulverulent material may be dusted in dry form on the entire exposed surface of the rubber layer, or may be otherwise applied. Other separating materials such as cellulose ester or cellulose ether films deposited from solution may be used. It is also possible to treat the entire exposed surface of the initial rubber deposit with a chemical such as a solution of bromine, chlorine, sulfur chloride, and the like, to destroy the cohesive character of the rubber.

After application of the separating layer or other adhesion-preventing treatment, the form, together with the associated coatings, is immersed in a liquid dispersion of rubber 16 to the top edge of the separating material (Fig. 5), thereby producing a second layer of rubber 17 over the underlying deposit and separating coating, resulting in two entirely separate and distinct superposed rubber bags of the shape shown, disposed in closely nested relation. This second deposit of rubber is usually made of a thickness equal to that of the first deposit. The two deposits are washed and thoroughly dried preferably while still on the form. The nested bags are stripped from the form and the bags are sealed, such as by pressing the edges together and vulcanizing.

To complete the assembled rubber safety device, an opening is made in both bags near one end of the bags and a screw type valve is inserted in the opening. The valve has a spring clamp 19 on one end. A metal cartridge 20 of compressed gas, such as carbon dioxide, is passed through the opening in the bags and placed so as to be held by the metal clamp. The valve is then sealed by screwing it down tightly, thereby completing the assembly of the swimmers' safety device (Figs. 6 and 7). This emergency device can be adapted into a belt intended to fit around a swimmer's mid-section or it can be placed in a fabric bag as part of a harness assembly to be worn by boatmen, hunters, fishermen, or anyone who is in danger of falling in the water. In an emergency, one end 21 of the metal cartridge 20, said end being lightly constructed, can be broken, thus releasing the gas, inflating the rubber bags, and thereby producing added buoyancy for the immersed one. The construction of the safety device is shown (Fig. 6) with the spring clip 19 of the valve 18 engaging the carbon dioxide cartridge 20 and with a portion of the rubber walls cut away to show the separate and superposed rubber bags 13 and 17 in closely nested relation. A cross-section of the article is shown (Fig. 7) taken along the line 7—7 of Fig. 6. This also shows the valve 18 with the gas-filled cartridge 20 in place, as well as the closely-fitted construction of the two expansible bags.

By making the article in the above manner with the grooves or channels folded inwardly, a safety device is made that is compact in size when deflated and with the channels allowing for expansion to a relatively large size. Because the two rubber bags are in superposed, closely nested, relationship they allow the compressed gas to expand without putting any undue stress on the walls. There is more strength present than if a single-walled article were made with the single wall equal in thickness to the sum of the thickness of the two single-walled bags. The inter-nested close fitting of the two bags distributes the inflation stresses between the two bags more uniformly than in prior devices and so contributes materially to safety.

In an alternative procedure designed to eliminate the careful manipulation required to dip the form to precisely the same depth in the successive baths, a small portion at the top of the initial rubber deposit may be left untreated with the cohesion preventing material and the second deposit may then be applied only to treated portions of the initial deposit. Such procedure is disadvantageous, however, in that the inner deposit will then extend out from the outer deposit and will have to be trimmed shorter prior to being sealed.

The expression "liquid dispersion of rubber" is herein used in a broad sense to include all naturally occurring, as well as artificially prepared flowable dispersions of rubber and analogous natural or synthetic gums and resins in liquid vehicles, whether solvents or non-solvents for rubber. Such liquid dispersions may contain any stabilizing, vulcanizing, age-resisting, or other compounding agents, and may be thickened, concentrated, or otherwise conditioned for use according to any of the well-known practices.

I have described herein a preferred method of making the article which is the subject of this invention but the article may be made in any desired way, such as by using separate forms of similar shape with one of the forms slightly smaller than the other and then assembling the article by placing the slightly smaller bag inside the larger.

Having described the construction and use of the swimmer's safety device together with a preferred method for making it, it is my desire that the invention be protected, broadly, limited only by the spirit and scope of the appended claims.

I claim:

1. As an article of manufacture, an inflatable safety device of the character described comprising two closely inter-fitted and nested one-piece seamless pouch-shaped rubber bags of like configuration in superposed relationship having the normally open end of the bags sealed, the inner surface of the unexpanded outer rubber bag corresponding in size to the outer surface of the unexpanded inner rubber bag; each bag having two diametrically opposite folds with the folds extending inwardly to allow for expansion of the article; said article having at least the inner bag gas-tight and containing a cartridge of compressed gas inside the inner bag, the cartridge being capable of being easily broken to release the gas and fill the inner bag of the safety device with the expanded gas.

2. As an article of manufacture, an inflatable safety device of the character described comprising two closely inter-fitted and nested one-piece seamless pouch-shaped rubber bags in superposed relationship, the inner dimensions and configuration of the unexpanded outer bag corresponding to the outer dimensions and configuration of the unexpanded inner bag, at least the inner bag being gas-tight, and means for filling the inner bag with gas.

3. As an article of manufacture a rubber article of the character described comprising a one-piece seamless inner rubber bladder together with a one-piece seamless outer rubber covering in superposed, non-adhesive relationship, with the inner surface of the outer cover corresponding in size to the outer surface of the inner rubber bladder and the two surfaces being closely nested together in contiguous relation substantially throughout their extent; said article having a convoluted surface comprising at least one inwardly folded channel.

4. In an inflatable safety device of the character which includes an inflatable member and means for inflating the member; two closely interfitted and nested one-piece seamless pouch-shaped rubber bags of like configuration in superposed relationship having the normally open end of the bags sealed, the inner surface of the unexpanded outer rubber bag corresponding in size to the outer surface of the unexpanded inner rubber bag; each bag having two diametrically opposite folds with the folds extending inwardly to allow for expansion of the article; said article having at least the inner bag gas-tight.

CARL L. BEAL.